United States Patent [19]
Seibold

[11] Patent Number: 6,113,191
[45] Date of Patent: Sep. 5, 2000

[54] STORABLE SEAT ASSEMBLY

[75] Inventor: Kurt Alan Seibold, Dearborn Heights, Mich.

[73] Assignee: Johnson Controls Technology Company, Plymouth, Mich.

[21] Appl. No.: 09/176,636

[22] Filed: Oct. 21, 1998

[51] Int. Cl.$^7$ ..................................................... B60N 2/02
[52] U.S. Cl. ........................ 297/378.1; 297/322; 297/483
[58] Field of Search ......................... 296/65.01; 297/316, 297/322, 378.1, 483, 331

[56] References Cited

U.S. PATENT DOCUMENTS

| | | |
|---|---|---|
| 3,202,453 | 8/1965 | Richards . |
| 3,727,976 | 4/1973 | Lystad . |
| 4,124,250 | 11/1978 | Weinich . |
| 4,382,629 | 5/1983 | Froumajou . |
| 4,627,656 | 12/1986 | Gokimoto et al. . |
| 4,636,003 | 1/1987 | Siebler . |
| 4,648,654 | 3/1987 | Voss . |
| 4,805,953 | 2/1989 | Yamauchi . |
| 4,957,321 | 9/1990 | Martin et al. . |
| 4,969,682 | 11/1990 | Gray . |
| 5,195,795 | 3/1993 | Cannera et al. . |
| 5,362,132 | 11/1994 | Griswold et al. . |
| 5,482,349 | 1/1996 | Richter et al. . |
| 5,542,745 | 8/1996 | Takeda et al. . |
| 5,570,931 | 11/1996 | Kargilis et al. . |
| 5,588,707 | 12/1996 | Bolsworth et al. . |
| 5,681,077 | 10/1997 | Hashimoto . |
| 5,681,079 | 10/1997 | Robinson . |
| 5,697,670 | 12/1997 | Husted et al. . |
| 5,730,496 | 3/1998 | Hashimoto . |

*Primary Examiner*—Milton Nelson, Jr.
*Attorney, Agent, or Firm*—Harness, Dickey & Pierce, P.L.C.

[57] ABSTRACT

A seat assembly that includes a seat bottom, a seat back, and a pivot mount for pivotally connecting the seat back to the seat bottom. The seat assembly further includes a guide member attaching the pivot mount to the vehicle, a leg link pivotally attaching the seat bottom to the vehicle, and an arm link pivotally attaching to the seat back to the vehicle. The leg link, the arm link, and the guide member all cooperate to guide the pivot mount, and hence the seat bottom and the seat back, in a downward and rearward direction from the in-use position to the stored position. Since the seat bottom moves in a downward direction from the in-use position to the stored position, the seat assembly forms a flat, uniform cargo area for increased cargo capabilities. Further, since the seat bottom and the seat back move in a rearward direction from the in-use position to the stored position, the seat assembly may include a longer seat back for increased passenger comfort without an increase in the fold-forward distance of the stored position.

21 Claims, 3 Drawing Sheets

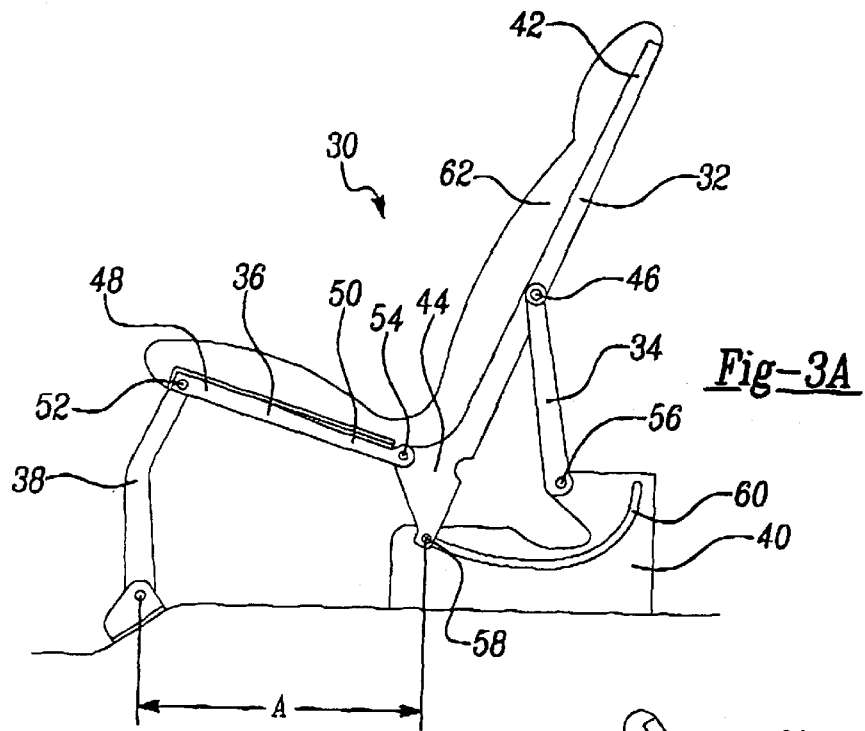
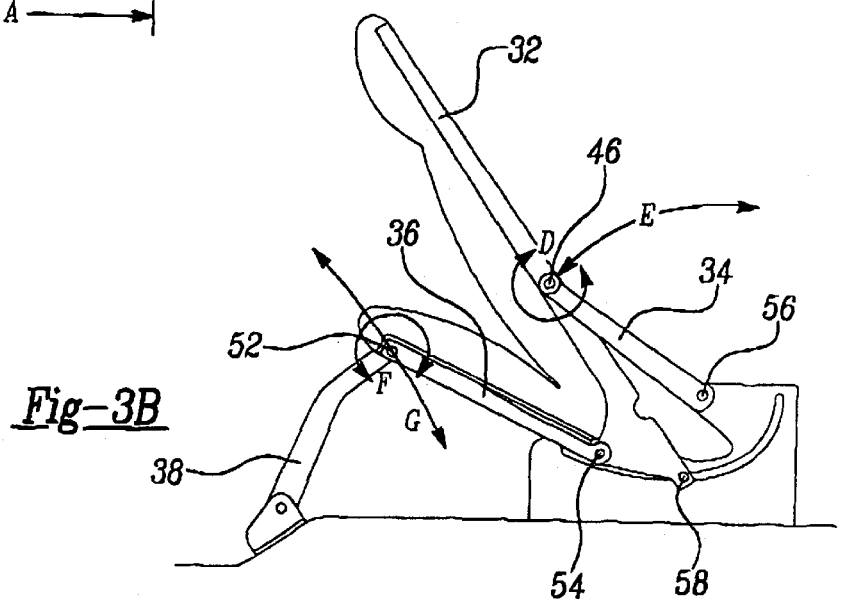
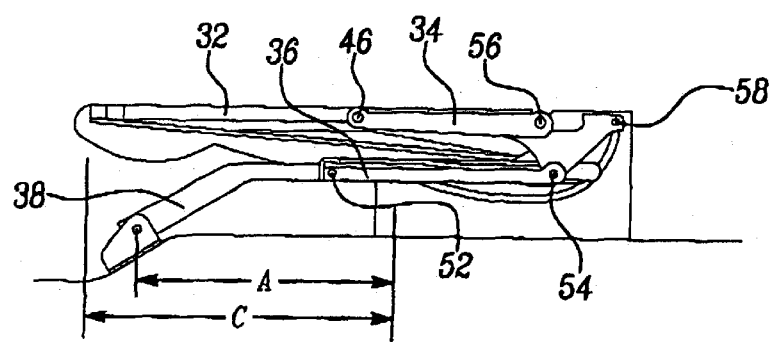

STORABLE SEAT ASSEMBLY

TECHNICAL FIELD OF THE INVENTION

This invention generally relates to storable seat assemblies in motor vehicles. More specifically, this invention relates to storable seat assemblies in motor vehicles that include a longer seat back to increase passenger comfort and that form a flat, uniform cargo area to increase cargo capabilities.

BACKGROUND

Whether for downhill skis or for large plywood, in some situations, vehicle owners desire to carry loads larger than the trunks or cargo space of their vehicles. Although vehicle owners could buy cars with larger trunks, or trucks with larger cargo space, many would rather simply convert their back seats into extra cargo space. Storable seat assemblies offer a solution to this problem by either holding passengers or carrying cargo.

Storable seat assemblies that are movable between an in-use position and a stored position have been used in automobiles for several decades. Although traditionally found in larger vehicles, like vans or sport-utility vehicles, many storable seats are recently being used in smaller vehicles, like sedans and coupes. By converting from one function to the other, the storable seat eliminates the need for larger trunks and cargo space. Without this need, vehicles can be made with shorter overall lengths and more fuel efficient shapes.

The conventional storable seat assemblies have, unfortunately, compromised both the comfort of the passengers with smaller seat backs and the capabilities of the cargo space with uneven surfaces. Recent efforts have attempted to address these compromises. U.S. Pat. No. 5,570,931 issued Nov. 5, 1996 to KARGILIS ET AL. and U.S. Pat. No. 5,588,707 issued Dec. 31, 1996 to BOLSWORTH ET AL. disclose a storable seat assembly that includes relatively taller seat backs and that form relatively flat, uniform surfaces. In their stored position, however, both of the KARGILIS and BOLSWORTH seat assemblies exhibit a long fold-forward distance. This distance approximately represents the greater length of the seat back. Because of this extended distance, the storable seat assembly must be placed at a longer distance from the front seats, forcing an increase of the interior dimensions of the vehicle. As can be easily appreciated, this increase in interior dimensions defeats the purpose of using a storable seat in a vehicle with shorter overall lengths and more fuel efficient shapes.

SUMMARY OF THE INVENTION

Accordingly, this invention provides for a storable seat assembly that overcomes the problems and disadvantages of the conventional techniques in the art. The invention also provides for a storable seat assembly that includes a longer seat back to increase passenger comfort and that forms a flat, uniform cargo area to increase cargo capabilities. Further, the invention provides for a storable seat assembly that does not increase the fold-forward distance in the stored position.

Briefly, the present invention includes a seat bottom, a seat back, and a pivot mount for pivotally connecting the seat back to the seat bottom. The seat assembly further includes a guide member attaching the pivot mount to the vehicle, a leg link pivotally attaching the seat bottom to the vehicle, and an arm link pivotally attaching to the seat back to the vehicle. The leg link, the arm link, and the guide member all cooperate to guide the pivot mount, and hence the seat bottom and the seat back, in a downward and rearward direction from the in-use position to the stored position.

Since the seat bottom moves in a downward direction from the in-use position to the stored position, the seat assembly forms a flat, uniform cargo area for increased cargo capabilities. Further, since the seat bottom and the seat back move in rearward direction from the in-use position to the stored position, the seat assembly may include a longer seat back for increased passenger comfort without an increase in the fold-forward distance of the stored position.

Further features and advantages of the invention will become apparent from the following discussion and accompanying drawings.

BRIEF DESCRIPTION OF THE DRAWINGS

FIG. 3A is a side elevation of a storable seat assembly according to the present invention in the in-use position;

FIG. 3B is a side elevation of the storable seat assembly of FIG. 3A in transition between the in-use position of FIG. 3A and the stored position of FIG. 3C;

FIG. 3C is a side elevation of the storable seat assembly of FIG. 3A in a stored position;

BRIEF DESCRIPTION OF THE PRIOR ART

Figures 1, 2A, 2B:
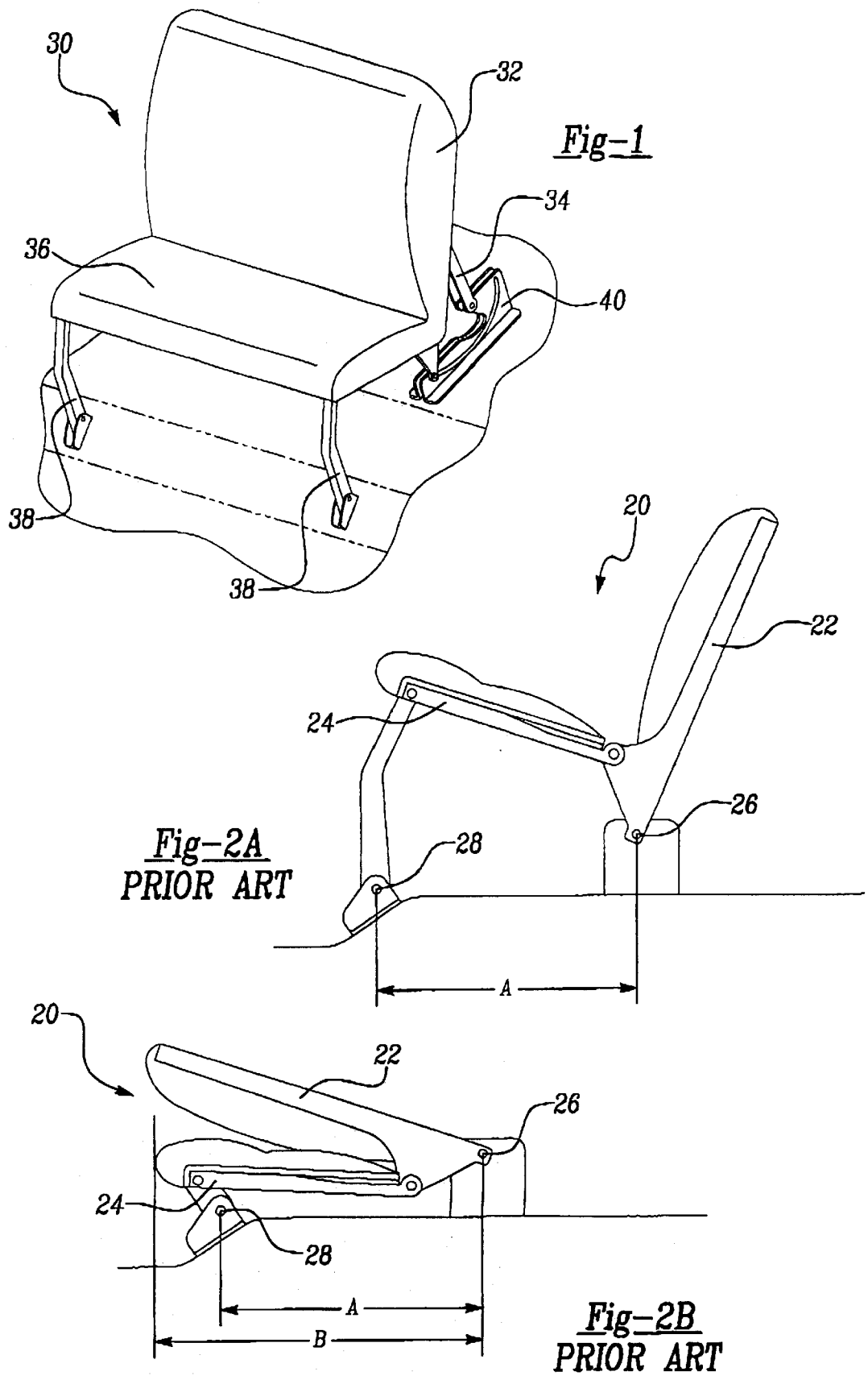
FIG. 1 is a perspective view of a storable seat assembly according to the present invention.
FIG. 2A is a side elevation of a prior art storable seat assembly in an in-use position.
FIG. 2B is a side elevation of the prior art storable seat assembly of FIG. 2 in a stored position.

One of the storable seat assemblies of the conventional techniques in the art is shown in FIGS. 2A and 2B. The seat assembly 20 includes a seat back 22 attached to a seat bottom 24, as shown in the in-use position in FIG. 2A. In the stored position, shown in FIG. 2B, the seat back 22 of the seat assembly 20 pivots from a pivot point 26 and exhibits a fold-forward distance B. The fold-forward distance B is measured from the stationary pivot point 26 to the either the top of the seat back 22 of the edge of the seat bottom 24, whichever is further. As seen in FIG. 2A, the seat back 22 is relatively short compared to front seats found in conventional vehicles and, as seen in FIG. 2B, the seat back 22 does not form a flat, uniform surface for the cargo area.

DETAILED DESCRIPTION OF THE PRESENT INVENTION

The following description of the preferred embodiment of the present invention is merely exemplary in nature, and is in no way intended to limit the invention or its application or uses.

The seat assembly 30 is shown in FIG. 1. The seat assembly 30 includes a seat back 32, an arm link 34, a seat bottom 36, a leg link 38, and a guide member 40. The seat assembly 30 is shown in a vehicle, which may be a larger vehicle, like a van or a sport-utility vehicle, a smaller vehicle, like a sedan or a coupe, or any other vehicle, like an airplane or a boat.

As shown in FIG. 3A, the seat back 32 of the seat assembly 30 includes an upper portion 42 and a lower portion 44. The upper portion 42 is defined as the portion of the seat back 32 that generally receives the upper torso of a passenger. The lower portion 44 is defined as the portion of the seat back 32 that generally receives the lower torso of a passenger. The seat back 32 is made of conventional materials, well known in the seat assembly arts.

The seat back 32 is pivotally attached to one end of the arm link 34 at the shoulder mount 46. At the other end, the arm link 34 is pivotally attached to the guide member 40. Alternatively, the arm link 34 may be attached to the vehicle or another structure (not shown). The attachments between the seat back 32 and the arm link 34 and between the arm link 34 and the guide member 40 are typical pin attachments, with the pin parts protruding from the arm link 34. Alternatively, the attachment may include a ball-and-socket attachment, a so-called "living hinge," or any other arrangement that provides a rotating joint. The arm link 34 is made of any high-strength material, known in the motor vehicle seat assembly arts.

The seat bottom 36 of the seat assembly 30 includes a front portion 48 and a rear portion 50. The front portion 48 is defined as the portion of the seat bottom 36 that supports the thighbones of a passenger. The rear portion is defined as the portion of the seat bottom 36 that receives the pelvic bones of a passenger. Like the seat back 32, the seat bottom 36 is made of conventional materials, well known in the seat assembly arts.

The seat bottom 36 is pivotally attached to one end of the leg link 38 at the knee mount 52. At the other end, the leg link 38 is pivotally attached to the vehicle. The attachments between the seat bottom 36 and the leg link 38 and between the leg link 38 and the vehicle are typical pin attachments, with the pin parts protruding from the leg link 38. Alternatively, the attachment may include a ball-and-socket attachment, a so-called "living hinge," or any other arrangement that provides a rotating joint. Like the arm link 34, the leg link 38 is made of any high-strength material, known in the motor vehicle seat assembly arts.

The seat bottom 36 is pivotally attached to the seat back 32 at the pivot mount 54. The pivot mount 54 allows the seat back 32 to fold forward into the stored position, as shown in FIGS. 3B and 3C. The attachment between the seat back 32 and the seat bottom 36 is a typical pin attachment, with the pin part protruding from the seat bottom 36. Alternatively, the attachment may include a ball-and-socket attachment, a so-called "living hinge," or any other arrangement that provides a rotating joint. The guide member 40 includes an arm link mount 56, a seat mount 58, and a guide track 60. The arm link mount 56 provides the pivotal attachment point for the arm link 34 while the seat mount 58 provides the pivotal attachment point for the seat back 32. The guide track 60 is an arcuate path for the travel of the seat mount 58. The guide track 60 is designed to allow the seat mount 58, connected to the seat back 32 and the seat bottom 36, to move in a downward and rearward direction during the transition from the in-use position to the stored position. The guide track 60 is made of any high-strength material, known in the motor vehicle seat assembly arts.

The guide track 60 has a downward and rearward sloping section to pull the seat assembly 30 in a rearward direction. Because the seat assembly 30 is guided in a rearward direction, the seat assembly 30 may include a longer seat back 32 for increasing passenger comfort without increasing the fold-forward distance C in the stored position, shown in FIG. 3C (the fold-forward distance C is measured from a stationary point at the beginning of the guide track 60 to the top of the seat back 32). The guide track 60 also has an upward sloping section to pivot the seat back 32 of the seat assembly 30 in a downward direction so that the seat assembly 30 forms a flat, uniform cargo area for increased cargo capabilities, shown in FIG. 3C.

An outer cushion 62 covers both the upward and lower portions 40 and 42 of the seat back 32 and the forward and rear portions 48 and 50 of the seat bottom 36. The outer cushion 62 provides a soft layer between the passenger and the seat back 32 and seat bottom 36. In an alternative embodiment, the outer cushion 62 may be two separate and distinct pieces, one piece connected to the seat back 32 and the other piece connected to the seat bottom 36. The outer cushion 62 is made of conventional materials, well known in the seat assembly arts.

In the in-use position, shown in FIG. 3A, the seat back 32 extends in a generally upward direction from the pivot mount 48. The upward direction is defined by the upper portion 40 of the seat back 32. In the stored position, shown in FIG. 3C, the seat back 32 extends in a generally forward direction from the pivot mount 48. The forward direction is defined by the front portion 48 of the seat bottom 36.

During the transition from the in-use position to the stored position, the arm link 34 and the guide member 40 cooperate to guide the seat back 32 through a complex motion, as shown in FIG. 3B. The seat back 32 is rotated with a rotational movement D about the shoulder mount 46, which acts as a transverse axis. Simultaneously, the shoulder mount 46 is rotated with a rotational movement E about the arm link mount 56, which acts as a second transverse axis. The rotational movement E tends to move the shoulder mount 46 in a downward direction. The combination of the two rotational movements D and E guides the seat back 32 in a downward and rearward direction to the stored position, as shown in FIG. 3C.

During the transition from the in-use position to the stored position, the leg link 36 and the guide member 40 cooperate to guide the seat bottom 36 through a complex motion, as shown in FIG. 3B. The front portion 48 of the seat back 32 is rotated with a rotational movement F about the knee mount 52. Simultaneously, the knee mount 52 is rotated with a rotational movement G. The combination of the two rotational movements F and G guides the seat bottom 36 in a downward and rearward direction to the stored position, as shown in FIG. 3C. The amount of rearward direction and the amount of downward direction of the seat bottom 36 are both approximately equal to the length of the leg link 38.

Since the seat assembly 30 is guided in a rearward direction, the seat assembly 30 may include a longer seat back 32 for increasing passenger comfort without increasing the fold-forward distance C in the stored position, as shown in FIG. 3C. Distance A represents the distance between the beginning of the guide track 60 and the attachment of the leg link 38 in the seat assembly 30. Distance A also represents the distance between the stationary pivot point 26 and the attachment of the leg link 28 to the vehicle in the conventional storable seat assembly 20. Distance A is the same in the seat assembly 30 and the conventional storable seat assembly 20, merely showing that the seat assembly 30 is proportionally similar to the conventional storable seat assembly 20. Even with a longer seat back 32, the fold-over distance C is smaller in the seat assembly 30 than the fold-over distance B of the conventional storable seat assembly 20. Further, since the seat assembly 30 is guided in a downward direction, the seat assembly 30 forms a flat, uniform cargo area for increasing cargo capabilities, also shown in FIG. 3C.

Figure 4:
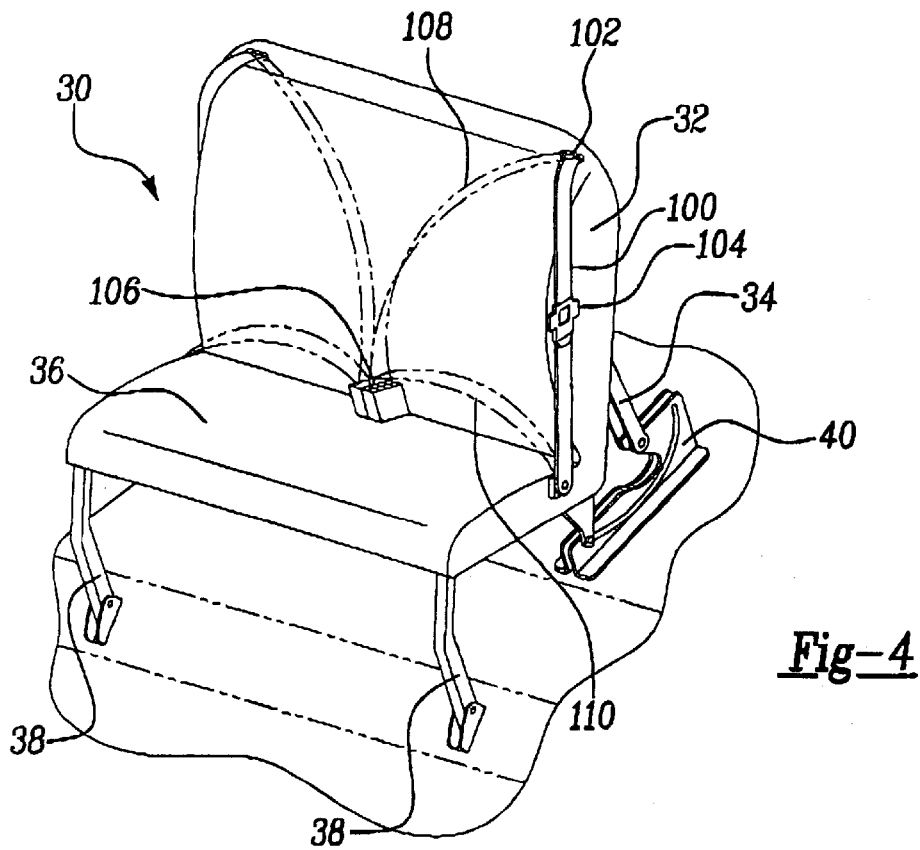
FIG. 4 is a perspective view of a storable seat assembly according to an alternative embodiment of the present invention.

In an alternative embodiment of the present invention, as shown in FIG. 4, the seat assembly 30 may include an integrated passenger restraint system mounted to the seat back 32. The restraint system includes a belt webbing 100 attached to the lower portion 44 of the seat back 32 and attached through the opening 102. A clasp 104 is slidable along the webbing 100 between the two attachments and is receivable into the buckle mechanism 106. When the clasp 104 is inserted into the buckle mechanism 106, the webbing 100 forms a shoulder belt 108 which crosses over the torso of a seat occupant and a lap belt 110 which crosses the lap of a seat occupant to restrain the occupant within the seat assembly 30. At the upper end of the seat back 32, the webbing 100 passes into the seat back 32 through the opening 102. The webbing 100 is routed to a webbing retractor (not shown) having a spool upon which excess webbing is wound. The retractor can be attached at the upper portion 42 of the seat back 32, or it can be mounted at the lower portion 44 of the seat back 32.

Figure 5:
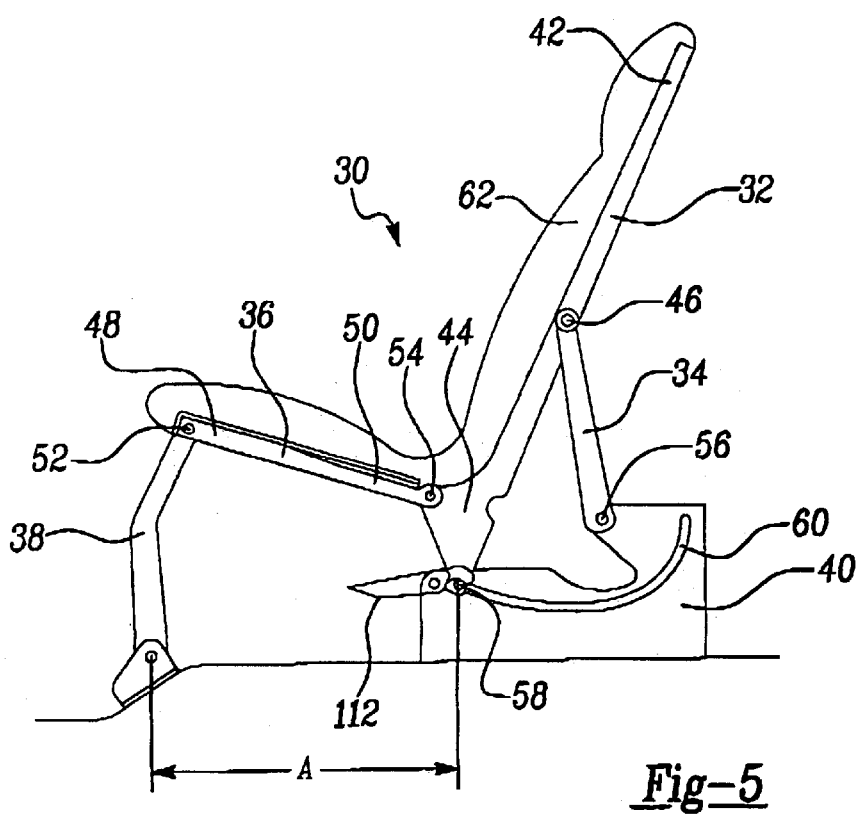
FIG. 5 is a side elevation of the alternative embodiment of FIG. 4 in the in-use position.

As shown in FIG. 5, the integrated passenger restraint system also includes a latch 112 for securing the seat assembly 30 in an in-use position. With the latch 112 in the engaged position, the seat back 32, the arm link 34, and the guide member 40 all form a triangular truss to resist the rotational movements D and E when the belt webbing 100 is in loaded tension, for an example, during a frontal collision. Further information on integrated passenger restraint systems can be found in U.S. Pat. No. 5,697,670 issued to HUSTED ET AL. on Dec. 16, 1997, which is incorporated in its entirety by this reference.

In a further alternative embodiment of the present invention, the seat assembly 30 may include a latch (not shown) for securing the seat assembly 30 in a stored position. The seat assembly 30 may also include a seat removal mechanism (also not shown) on the leg link 38 and on the guide member 40 to release the seat assembly 30 from a vehicle. This would allow the seat assembly to be removed altogether from a vehicle when not in use. Both the latch and the seat removal mechanism are well known in the seat assembly arts.

The foregoing discussion discloses and describes a preferred embodiment of the present invention. One skilled in the art will readily recognize from such discussion, and from the accompanying drawings and claims, that changes and modifications can be made to the invention without departing from the true spirit and fair scope of the invention as defined in the following claims.

I claim:

1. A seat assembly for a vehicle, movable from an in-use position to a stored position, comprising:
    a seat bottom having a front portion and a rear portion;
    a seat back coupled to said rear portion of said seat bottom; wherein said seat back extends in a generally upward direction from said seat bottom in the in-use position and said seat back extends in a generally forward position in the stored position;
    a guide member associated with said seat bottom and attachable to the vehicle; and
    a leg link pivotally attached to said seat bottom and pivotally attachable to the vehicle at a leg link mount; wherein said leg link and said guide member cooperate to guide said seat bottom from the in-use position to the stored position;
    such that said seat bottom is displaced in a rearward direction in the stored position relative to the in-use position and said leg link mount is constrained from rearward displacement during the transition from the stored position to the in-use position.

2. The seat assembly of claim 1, such that said seat bottom is also displaced in a downward direction in the stored position relative to the in-use position.

3. A seat assembly for a vehicle, movable from an in-use position to a stored position, comprising:
    a seat bottom defining first and second attachment points;
    a seat back defining first, second, and third attachment points; wherein said second attachment point of said seat back is pivotally attached to said second attachment point of said seat bottom;
    a guide member attachable to the vehicle for engaging said third attachment point of said seat back and allowing a forward and rearward displacement relative to the vehicle;
    a leg link pivotally attached to said first attachment point of said seat bottom;
    an arm link pivotally attached to said first attachment point of seat back; and
    a belt webbing operatively associated with said seat back above said third attachment point and extending in a forward direction whereby tension in said belt webbing biases said seat back to rotate about said third attachment point and to move in a downward direction; wherein said arm link, said seat back, and said guide member cooperate to form a triangular truss to resist said bias;
    wherein said leg link, said arm link, and said guide member cooperate to guide said seat bottom from the in-use position to the stored position and to guide said seat back from the in-use position to the stored position; and wherein said seat back extends in a generally upward direction from said second attachment point of said seat bottom in the in-use position and said seat back extends in a generally forward position from said second attachment point of said seat bottom in the stored position.

4. A seat assembly for a vehicle, movable from an in-use position to a stored position, comprising:
    a seat bottom defining first and second attachment points;
    a seat back defining first, second, and third attachment points; wherein said second attachment point of said seat back is pivotally attached to said second attachment point of said seat bottom;
    a guide member attachable to the vehicle for engaging said third attachment point of said seat back and allowing a forward and rearward displacement relative to the vehicle;
    a leg link pivotally attached to said first attachment point of said seat bottom; and
    an arm link pivotally attached to said first attachment point of seat back;
    wherein said leg link, said arm link, and said guide member cooperate to guide said seat bottom from the in-use position to the stored position and to guide said seat back from the in-use position to the stored position; wherein said seat back extends in a generally upward direction from said second attachment point of said seat bottom in the in-use position and said seat back extends in a generally forward position from said second attachment point of said seat bottom in the stored position; and wherein said seat back is rotated about said third attachment point in the stored position relative to the in-use position, and said third attachment point is displaced in a downward direction in the stored position relative to the in-use position.

5. The seat assembly of claim 4, wherein said arm link is pivotally attachable to the vehicle at an arm link mount; and wherein said third attachment point is rotated about said arm link mount in the stored position relative to the in-use position.

6. The seat assembly of claim 5, wherein said seat bottom is displaced in a rearward direction in the stored position relative to the in-use position.

7. The seat assembly of claim 6, wherein said seat bottom is also displaced in a downward direction in the stored position relative to the in-use position.

8. The seat assembly of claim 4, wherein said seat bottom is displaced in a rearward direction in the stored position relative to the in-use position.

9. The seat assembly of claim 8, wherein said seat bottom is also displaced in a downward direction in the stored position relative to the in-use position.

10. A seat assembly for a vehicle, movable from an in-use position to a stored position, comprising:

a seat bottom defining first and second attachment points;

a seat back defining first, second, and third attachment points; wherein said second attachment point of said seat back is pivotally attached to said second attachment point of said seat bottom;

a guide member attachable to the vehicle for engaging said third attachment point of said seat back and allowing a forward and rearward displacement relative to the vehicle;

a leg link pivotally attached to said first attachment point of said seat bottom; and an arm link pivotally attached to said first attachment point of said seat back;

wherein said leg link, said arm link, and said guide member cooperate to guide said seat bottom from the in-use position to the stored position and to guide said seat back from the in-use position to the stored position; wherein said seat back extends in a generally upward direction from said second attachment point of said seat bottom in the in-use position and said seat back extends in a generally forward position from said second attachment point of said seat bottom in the stored position; and wherein said seat bottom is displaced in a rearward direction in the stored position relative to the in-use position.

11. The seat assembly of claim 10, wherein said seat bottom is also displaced in a downward direction in the stored position relative to the in-use position.

12. A seat assembly for a vehicle, movable from an in-use position to a stored position, comprising:

a seat bottom having a front portion and a rear portion;

a seat back having a first transverse axis; wherein said seat back is coupled to said rear portion of said seat bottom; and wherein said seat back extends in a generally upward direction from said seat bottom in the in-use position and said seat back extends in a generally forward position in the stored position;

a guide member coupled to said seat back and attachable to the vehicle; and an arm link pivotally attached to said seat back at said first transverse axis and pivotally attachable to the vehicle at a second transverse axis; wherein said arm link and said guide member cooperate to guide said seat back from the in-use position to the stored position;

such that said seat back is rotated about said first transverse axis in the stored position relative to the in-use position, and said first transverse axis is displaced in a downward direction in the stored position relative to the in-use position.

13. The seat assembly of claim 12, wherein said first transverse axis is rotated about said second transverse axis in the stored position relative to the in-use position.

14. The seat assembly of claim 13, wherein said seat bottom is displaced in a rearward direction in the stored position relative to the in-use position.

15. The seat assembly of claim 14, further comprising a leg link pivotally attached to said seat bottom and pivotally attachable to the vehicle; wherein said leg link and said guide member cooperate to guide said seat bottom from the in-use position to the stored position.

16. The seat assembly of claim 15, wherein said seat bottom is also displaced in a downward direction in the stored position relative to the in-use position.

17. The seat assembly of claim 16, further comprising a leg link pivotally attached to said seat bottom and pivotally attachable to the vehicle; wherein said leg link and said guide member cooperate to guide said seat bottom from the in-use position to the stored position.

18. The seat assembly of claim 12, wherein said seat bottom is displaced in a rearward direction in the stored position relative to the in-use position.

19. The seat assembly of claim 18, further comprising a leg link pivotally attached to said seat bottom and pivotally attachable to the vehicle; wherein said leg link and said guide member cooperate to guide said seat bottom from the in-use position to the stored position.

20. The seat assembly of claim 18, wherein said seat bottom is also displaced in a downward direction in the stored position relative to the in-use position.

21. The seat assembly of claim 20, further comprising a leg link pivotally attached to said seat bottom and pivotally attachable to the vehicle; wherein said leg link and said guide member cooperate to guide said seat bottom from the in-use position to the stored position.

* * * * *